US012116447B2

(12) United States Patent
Bai et al.

(10) Patent No.: US 12,116,447 B2
(45) Date of Patent: Oct. 15, 2024

(54) ADHESIVE COMPOSITION

(71) Applicant: Dow Global Technologies LLC, Midland, MI (US)

(72) Inventors: ChenYan Bai, Shanghai (CN); Hongyu Chen, Shanghai (CN); Thorsten Schmidt, Richterswil (CH); Yingfeng Yu, Shanghai (CN); Haijun Dong, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 492 days.

(21) Appl. No.: 17/604,690

(22) PCT Filed: Apr. 18, 2019

(86) PCT No.: PCT/CN2019/083180
§ 371 (c)(1),
(2) Date: Oct. 18, 2021

(87) PCT Pub. No.: WO2020/211035
PCT Pub. Date: Oct. 22, 2020

(65) Prior Publication Data
US 2022/0195105 A1 Jun. 23, 2022

(51) Int. Cl.
*C08G 18/16* (2006.01)
*C08G 18/10* (2006.01)
*C09J 175/04* (2006.01)
*B01J 31/12* (2006.01)

(52) U.S. Cl.
CPC ........... *C08G 18/168* (2013.01); *C08G 18/10* (2013.01); *C09J 175/04* (2013.01); *B01J 31/123* (2013.01)

(58) Field of Classification Search
CPC ....... C08G 18/168; C08G 18/10; C09J 175/04
See application file for complete search history.

(56) References Cited

U.S. PATENT DOCUMENTS

| 3,474,075 A | 10/1969 | Zemlin et al. |
| 3,557,032 A | 1/1971 | Zemlin et al. |
| 4,119,585 A | 10/1978 | Kenney et al. |
| 4,521,545 A | 6/1985 | Kenney et al. |
| 4,608,407 A | 8/1986 | Kenney et al. |
| 4,613,660 A | 9/1986 | Goel et al. |
| 4,824,595 A | 4/1989 | Richter et al. |
| 5,045,226 A | 9/1991 | Richter et al. |
| 5,075,468 A | 12/1991 | Frances et al. |
| 5,665,822 A * | 9/1997 | Bitler ................ C06B 45/18 525/445 |
| 6,001,204 A | 12/1999 | Halg et al. |
| 8,318,830 B2 | 11/2012 | Kohli Steck et al. |
| 8,519,038 B2 | 8/2013 | Burckhardt et al. |
| 8,822,622 B2 | 9/2014 | Huybrechts et al. |
| 8,828,902 B2 | 9/2014 | Ramarao et al. |
| 8,933,138 B2 | 1/2015 | Hintermann et al. |
| 8,946,372 B2 | 2/2015 | Richter et al. |
| 9,416,215 B2 | 8/2016 | Krause et al. |
| 10,597,482 B2 | 3/2020 | Schmider et al. |
| 2012/0023218 A1 | 1/2012 | Journeau et al. |

FOREIGN PATENT DOCUMENTS

| CA | 2314498 A1 | 1/2001 |
| CN | 101687775 A | 3/2010 |
| CN | 107532058 A | 1/2018 |
| CN | 107987778 A | 5/2018 |
| CN | 108976783 A | 12/2018 |
| EP | 1072622 A1 | 1/2001 |
| EP | 1647587 A1 | 4/2006 |
| EP | 2698200 A1 | 2/2014 |
| ES | 2183435 T5 | 3/2003 |
| GB | 967443 A | 8/1964 |
| GB | 1192611 A | 5/1970 |
| JP | 2008248152 A | 10/2008 |
| WO | 1996/027641 A1 | 9/1996 |
| WO | 2011/048205 A1 | 4/2011 |
| WO | 201620525 A2 | 2/2016 |
| WO | 2016/205252 A1 | 12/2016 |
| WO | 2017/166005 A1 | 10/2017 |

OTHER PUBLICATIONS

Bantu, "CO2 and Sn-II Adducts of N-Heterocyclic Carbenes as Delayed-Action Catalysts for Polyurethane Synthesis.", Chemistry—a European Journal 15, 2009 pp. 3103-3109.
Carroy, "Novel latent catalysts for 2K-PUR systems.", Progress in Organic Coatings 68, 2010, pp. 37-41.
Jousseaume, "Silicone Curing and Polyurethane Preparation Promoted by Latent Organotin Catalysts.", Applied Organometallic Chemistry, 1991, pp. 135-138.
PCT/CN2019/083180, International Search Report and Written Opinion of the International Searching Authority, Mailed Jan. 23, 2020.

* cited by examiner

*Primary Examiner* — Michael L Leonard
(74) *Attorney, Agent, or Firm* — Boyle Fredrickson, S.C.

(57) ABSTRACT

An adhesive composition including a reaction mixture of: (A) at least one isocyanate-containing compound; (B) at least one polyol compound; and (C) a copolymerized crystalline latent catalyst; a process for making the above adhesive composition; and a laminate structure made using the above adhesive composition.

12 Claims, No Drawings

ADHESIVE COMPOSITION

FIELD

The present invention relates to an adhesive composition; and more specifically, the present invention relates to a polyurethane adhesive composition containing a copolymerized crystalline polymer functioning as a latent catalyst.

BACKGROUND

Solventless polyurethane (PU) adhesives are commonly formulated with two components and are referred to as a two-component (2K) system; wherein the first component of the 2K system is an isocyanate prepolymer and the second component of the 2K system is a polyol. The two components are mixed together just prior to application of the resulting mixture. Upon mixing of the two components, a chemical reaction takes place between the isocyanate (NCO) group of the isocyanate prepolymer and the hydroxyl (OH) group of the polyol. This reaction leads to a viscosity increase of the adhesive and, ultimately, a curing of the adhesive.

The period of time, before the viscosity of the adhesive formulation or composition builds up to the point that the viscosity increase no longer allows the adhesive to be coated onto a substrate, is typically referred to as the "pot life" of the adhesive. An adhesive with a long pot life is desirable to improve operation and process flexibility; and an adhesive with a fast curing speed is also desirable to achieve the required final performance as soon as possible so that the adhesive can be used to produce laminates and the laminates can move quickly into a slitting or a bag making stage in a production process. Typically, a catalyst is added to the adhesive composition to speed up the curing of the composition. However, heretofore known adhesives compositions including known catalysts either: (1) have a good pot life with a slow curing speed; or (2) have a fast curing speed with a short pot life; but the known catalysts do not exhibit both a good pot life and a fast curing speed.

It is therefore desirable to provide an adhesive composition which has both a fast curing speed and a long pot life.

SUMMARY

The present invention is directed to a lamination adhesive for preparing laminate structures. In one preferred embodiment, the adhesive composition includes a reaction mixture of: (A) at least one isocyanate-containing compound; (B) at least one polyol compound; and (C) a copolymerized crystalline latent catalyst. In one preferred embodiment, the copolymerized crystalline latent catalyst includes the reaction product of: (a) at least one crystalline acrylate monomer; (b) at least one tin-containing catalyst compound; (c) at least one initiator; (d) at least one chain transfer agent; and (e) optionally, at least one solvent.

Some of the advantages of the adhesive composition of the present invention include: (1) an adhesive composition that exhibits an excellent pot life; (2) an adhesive composition containing a catalyst, wherein the catalyst can be activated at a low activation temperature (e.g., less than 80° C.) to begin the curing of the adhesive composition and wherein the catalyst will not compromise the pot life of the adhesive composition; and (3) an adhesive composition that contains uncomplicated reaction components so as to improve the handling of the adhesive composition.

DETAILED DESCRIPTION

"Latency", with reference to a catalyst, herein means the catalyst does not catalyze a reaction at certain conditions, such as the temperature of the operation, while the catalyst does start to catalyze the same reaction under other different conditions (such as by raising the temperature of the reaction).

A "thermal latent catalyst" is a catalyst that is not in its active state at a first low temperature (e.g., at a room temperature of 25° C.) until the catalyst is heated to a second high temperature (e.g., 40° C.).

"Pot-life", with reference to a two-component polyurethane adhesive composition, herein means the period of time before the viscosity of the adhesive composition builds up to the point that the adhesive composition is no longer suitable to be coated onto a substrate.

In one broad embodiment, the adhesive formulation or composition of the present invention can include a reaction mixture of: (A) at least one isocyanate group-containing component; (B) at least one polyol component (or a hydroxyl group-containing component); and (C) a copolymerized crystalline latent catalyst. In one preferred embodiment, the adhesive composition can be a solventless 2K PU system but the present invention is not limited to such 2K system. Other additives and compounds can be used to form the adhesive composition of the present invention.

The isocyanate group-containing compound, component (A), useful in the adhesive composition of the present invention can include, for example, at least one compound having two or more isocyanate groups per molecule. In one embodiment, component (A) can include one or more isocyanate-functionalized polyurethane prepolymers. The polyurethane prepolymer can be a compound such as a compound that results, for example, from the reaction of a polyol compound (or other active hydrogen-functionalized compounds) with at least one isocynate having a functionality of at least two. The above reaction can take place without solvent or in the presence of a solvent such as ethyl acetate, acetone, methyl ethyl ketone, and mixtures thereof. The polyurethane prepolymer can include not only compounds having a relatively low molecular weight, such as are formed, for example, from the reaction of a polyol with an excess of polyisocyanate, but also oligomeric or polymeric compounds.

Component A used in the present invention generally has a molecular weight of from 500 grams per mole (g/mol) to 30,000 g/mol in one embodiment, from 600 g/mol to 15,000 g/mol in another embodiment, and from 700 g/mol to 10,000 g/mol in still another embodiment. The above molecular weights based on the polymeric compounds refer, unless otherwise indicated, to numerical average molecular weight (Mn).

In general, suitable polyisocyanates mentioned above may include, for example, aliphatic or aromatic polyisocyanates; and in one preferred embodiment, aromatic polyisocyanates is used in the present invention. For example, 4,4'-diphenylmethane diisocyanate (MDI) or its isomers; tolylene diisocyanate (TDI) or its isomers; or polymeric diphenylmethane diisocyanate can be used as the polyisocyanate in the present invention. In one preferred embodiment, MDI monomers are used in the present invention.

In general, suitable polyol components mentioned above may include, for example, polyether polyols, polyester polyols, bio-based polyol and mixtures thereof. The polyether polyols may include, for example, polyaddition products of ethylene oxide, propylene oxide, tetrahydrofuran, butylene oxide and the co-addition and grafted products thereof; as well as, the polyether polyols obtained by condensation of polyhydric alcohols or mixtures thereof. Examples of polyether polyols suitable for use in the present invention may include, but are not limited to, polypropylene glycol (PPG), polyethylene glycol (PEG), polybutylene glycol, polytetramethylene ether glycol (PTMEG), and mixtures thereof. The polyether polyol may have a molecular weight of from 300 g/mol to 3,000 g/mol in one embodiment, from 350 g/mol to 2,500 g/mol in another embodiment, and from 400 g/mol to 2,200 g/mol in still another embodiment.

Polyester polyol components useful in the present invention are polycondensation products of difunctional or trifunctional alcohols with dicarboxylic acids and or tricarboxylic acids. Examples of alcohols can include ethylene glycol, diethylene glycol, neopentyl glycol, hexanediol, butanediol, propylene glycol, glycerin, trimethylolpropane and mixtures thereof. Particular suitable alcohols can include for example hexanediol, ethylene glycol, diethylene glycol, neopentyl glycol and mixtures of two or more thereof. Examples of acids can include adipic acid, succinic acid, maleic acid, fumaric acid, phthalic acid, isophthalic acid, terephthalic acid, and mixtures thereof. Particular suitable acids can be isophthalic acid, adipic acid and mixtures thereof. The polyester polyol may have a molecular weight of from 600 g/mol to 10,000 g/mol in one embodiment, from 700 g/mol to 8,000 g/mol in another embodiment, and from 800 g/mol to 3,000 g/mol in still another embodiment.

The bio-based polyols useful in the present invention can include, for example, one or more bio-based polyols such as castor oil or other similar bio-based polyols. In one embodiment, the bio-based polyol has a hydroxyl group functionality of at least 1.5 and up to 4, i.e., the hydroxyl group functionality of the bio-based polyols can be from $1.5 \leq f \leq 4$.

The polyol component, component (B), can be a solution, mixture or blend of one or more compounds including, for example: at least one polyether polyol compound, and/or polyester polyol compound, bio-based polyol or their mixtures. The polyol compound useful in the adhesive composition of the present invention can include, for example, any one of, or any combination or two or more of, the polyether polyols, the polyester polyols, and the bio-based polyols described above. For example, the polyether polyols suitable for use according to this disclosure can be the polyaddition products of ethylene oxide, propylene oxide, tetrahydrofuran, butylene oxide, and the co-addition and grafted products thereof, as well as the polyether polyols obtained by condensation of polyhydric alcohols and mixtures thereof. Examples of polyether polyols suitable for use in the present invention can include, but are not limited to, PPG, PEG, polybutylene glycol, and PTMEG.

The polyester polyol components can be the polycondensation product of difunctional or trifunctional alcohols with dicarboxylic acids and or tricarboxylic acids. Examples of alcohols can include ethylene glycol, diethylene glycol, neopentyl glycol, hexanediol, butanediol, propylene glycol, glycerin or trimethylolpropane. In one preferred embodiment, the suitable alcohols can be hexanediol, ethylene glycol, diethylene glycol, neopentyl glycol and mixtures of two or more thereof. Examples of acids can be adipic acid, succinic acid, maleic acid, fumaric acid, phthalic acid, isophthalic acid, terephthalic acid, and mixtures thereof. Particular suitable acids used in the present invention are isophthalic acid, adipic acid, and mixture thereof. Polyester polyol may have a molecular weight of from 600 g/mol to 10,000 g/mol in one embodiment, from 700 g/mol to 8,000 g/mol in another embodiment, and from 800 g/mol to 6,000 g/mol in still another embodiment.

As aforementioned, when using a bio-based polyol, the bio-based polyols useful in the present invention can include, for example, one or more bio-based polyols such as castor oil or other similar bio-based polyols. And, in one embodiment, the bio-based polyol has a hydroxyl group functionality of at least 1.5 and up to 4, i.e., the hydroxyl group functionality of the bio-based polyols can be from $1.5 \leq f \leq 4$.

For the adhesive composition of the present invention, the weight ratio of the isocyanate component (A) to the polyol component (B) can be 1:2 to 3:1 in one embodiment, 1:1 to 2:1 in another embodiment, and 2:1 to 1:3 in still another embodiment.

The copolymerized crystalline latent catalyst, component (C), used in preparing the adhesive composition of present invention can be any one or more of the copolymerized crystalline latent catalysts describe in co-pending Chinese Patent Application No. PCT/CN2019/083167, filed by Lucy Bai et al., on Apr. 18, 2019. For example, in one embodiment, the copolymerized crystalline latent catalyst includes the reaction product of: (a) at least one crystalline monomer compound such as crystalline acrylate monomer, for example crystalline octadecyl acrylate (e.g., 18AA available from Scientific Polymer) that forms a crystalline polymer; (b) at least one copolymerizable latent catalyst compound, such as a tin-containing catalyst compound (e.g., dibutyltin maleate [DBTM]) that can be grafted onto the crystalline polymer backbone to form a catalyst grafted crystalline polymer latent catalyst; (c) at least one initiator such as 2,2'-azobisisobutyro nitrile (AIBN); (d) at least one chain transfer agent such as dodecyl mercaptan (DDM); and (e) optionally, at least one solvent such as toluene.

In general, the copolymerized crystalline latent catalyst, component (C), can be prepared, for example, using a copolymerization process wherein a catalyst compound such as DBTM is grafted onto a crystalline polymer backbone to form a catalyst grafted crystalline polymer latent catalyst composition. The grafted latent catalyst, component (C), can then be combined with the isocyanate, component (A), and the polyol component (B), to prepare the adhesive composition of the present invention.

One embodiment of producing the copolymerized crystalline latent catalyst, component (C), includes a copolymerization method to polymerize the copolymerizable latent catalyst compound such as a tin-containing latent catalyst compound (e.g., DBTM) with the crystalline monomer compound such as crystalline octadecyl acrylate (e.g., 18AA) to fix the latent catalyst to the crystalline polymer backbone; and thus, forming a copolymerized crystalline latent catalyst structure. For example, in one preferred embodiment, the copolymerization method used to form such catalyst structure is the catalyst structure shown in Scheme (I) as follows:

Scheme (I)

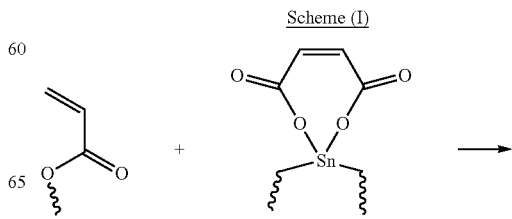

-continued

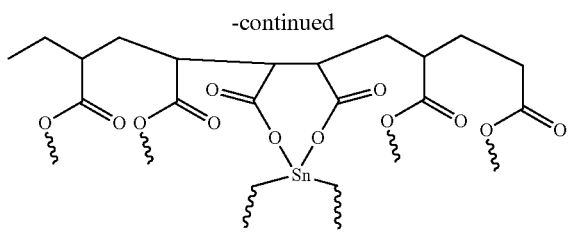

Advantageously, the latent catalyst in the grafted polymer remains inactive (deactivated) during a first operation temperature of the adhesive composition which is below the melting point of the crystalline polymer. Thereafter, when the adhesive composition is subjected to a second curing temperature, which is above the melting point of the crystalline polymer (i.e., a temperature higher than the operation temperature), the catalyst is activated (i.e., the catalyst can be activated by heat when the temperature rises to the curing conditions) which then accelerates the reaction between the components in the adhesive composition to cure. During the time the latent catalyst remains inactive at the first operation temperature, no significant compromise to the pot life of the adhesive composition is observed.

The amount of copolymerized crystalline latent catalyst, component (C), used to prepare the adhesive composition of the present invention can be, for example, from 0.001 wt % to 10 wt % in one embodiment, from 0.005 wt % to 8 wt % in another embodiment and from 0.01 wt % to 6 wt % in still another embodiment.

Although the adhesive composition of the present invention is directed to a two-component system, the adhesive composition of the present invention may be formulated with a wide variety of optional additives to enable performance of specific functions while maintaining the excellent benefits/properties of the resulting adhesive product. In addition to the copolymerized crystalline latent catalyst, the isocyanate compound, and the polyol compound, the adhesive composition of the present invention may also include one or more optional compounds known in the art for their use or function. For example, some of the optional compounds or additives useful in the composition may include, solvents such as ethyl acetate, acetone, and ketone and mixtures thereof; adhesion promoters such as silane, epoxy resins, phenolic resins and mixtures thereof; chain extenders such as glycerin, trimethylol propane, diethylene glycol, propanediol, 2-methyl-1, 3-propanediol and mixtures thereof.

In one preferred embodiment, the optional component, component (D), of the polyurethane adhesive can be added to the second polyol component (B). The amount of an optional additive, component (D), when used in the 2K adhesive composition, can be generally in the range of from 0 wt % to 20 wt % in one embodiment; from 0.01 wt % to 10 wt % in another embodiment; and from 1 wt % to 5 wt % in still another embodiment, based on the total weight of the components in the composition.

In a general embodiment, the process for making the adhesive composition of the present invention includes the steps of blending, mixing, or admixing: (A) the isocyanate group-containing component; (B) the polymer compound described above; (C) the copolymerized crystalline latent catalyst described above; and (D) any other desired optional components.

For example, the components (A)-(D) can be mixed together in the desired concentrations discussed above and at a temperature of from 25° C. to 45° C. in one embodiment; and from 30° C. to 40° C. in another embodiment. The order of mixing of the components is not critical and two or more components can be mixed together followed by addition of the remaining components. The adhesive composition components may be mixed together by any known mixing process and equipment.

In general, the components (A) and (B) are prepared separately from one another; and the components are each stored in a separate container. The latent catalyst, component (C), and the other components or optional additives of the adhesive composition may be present as part of the second component (B). A suitable container for the storage of each component can be, for example, a drum, a hobbock, a bag, a bucket, a can, a cartridge or a tube. Prior to the application of the adhesive composition, the two components are stored separately and mixed with one another only during or immediately prior to the application.

Once the adhesive composition of the present invention is prepared, the copolymerized crystalline catalyst remains inactive at the operation temperature until the adhesive composition has been used or applied to two substrates to bond the two substrates together; and until the adhesive composition is ready to be cured at an elevated temperature. The adhesive composition of the present invention can exhibit several advantageous properties such as almost no compromise to pot life versus an adhesive without the addition of copolymerized crystalline catalyst); and fast bond strength development versus an adhesive without the addition of copolymerized crystalline catalyst as measured by a conventional T-peel test).

For example, the pot life of the adhesive composition can be the same or maximum 5 minutes (min) shorter versus the adhesive without the addition of copolymerized crystalline catalyst. The pot life of the adhesive composition is measured by tracking the viscosity change of the adhesive composition at a certain temperature (for example, 30° C.), and recording the time the adhesive composition takes to reach 3,000 millipascals seconds (mPa·s) viscosity.

Some of the other advantageous properties exhibited by the adhesive composition of the present invention made by the above-described process can include fast bond strength development, and the bond strength is tested with 15 millimeters (mm) width strips using T-peel testing under a 250 millimeter per minute (mm/min) crosshead speed using a 5940 Series Single Column Table Top System (available from Instron Corporation). The results of the T-peel tests are in the unit of Newtons per 15 millimeters (N/15 mm). Relatively higher values from the T-peel tests results indicate better bond strengths.

In one broad embodiment, the adhesive composition of the present invention can be used to bond together at least two substrates (e.g., at least a first substrate and at least a second substrate) to form a layered laminate structure wherein the adhesive composition is applied and is disposed between the two substrates.

The first and second substrates can be made of the same or different materials. Suitable materials include paper, woven and nonwoven fabric, metal foil, polymers, metal-coated polymers, and mixtures thereof. Materials optionally may have a surface on which an image is printed with ink; and the ink may be in contact with the adhesive composition. In some embodiments, the materials can include polymer films and metal-coated polymer films. In a preferred embodiment, the material includes polymer films, for example polyethylene terephthalate (PET), polyethylene (PE), and mixtures thereof.

The laminates can be prepared with well know lamination process by those skilled in the art of lamination, for example, a typical Nordmeccanica solventless machine or a typical dry lamination machine can be used in the present invention.

The laminate article made in accordance with the present invention may be useful in a variety of applications including, for example, in the production of dry food packages, heavy duty packages, and liquid sachet packages; and in the production of stand-up pouch packages and any other packages.

EXAMPLES

The following examples are presented to further illustrate the present invention in detail but are not to be construed as limiting the scope of the claims. Unless otherwise indicated, all parts and percentages are by weight.

Various terms and designations and raw materials (or ingredients) used in the Inventive Examples (Inv. Ex.) and the Comparative Examples (Comp. Ex.) which follow are explained in the following Table I.

TABLE I

Raw Materials

| Ingredient Name | Ingredient | Brief Description | Supplier |
|---|---|---|---|
| 18AA | octadecyl acrylate | crystalline acrylate monomer | Scientific Polymer (SP) |
| 22AA | docosyl acrylate | crystalline acrylate monomer | SP |
| AIBN | azobisisobutyronitrile | initiator | Sinopharm Chemical Reagent (SCR) |
| DBTM | dibutyltin maleate | catalyst | SCR |
| DDA | dodecanethiol | chain transfer agent | SCR |
| MF706A | NCO prepolymer | Component A | The Dow Chemical Company (Dow) |
| C79 | OH component | Component B | Dow |

Synthesis of Copolymerized Crystalline Catalyst

The copolymerized crystalline catalyst was prepared in a toluene solution according to the following process: crystalline acrylate monomer, DBTM, initiator AIBN, chain extender and toluene were mixed together with slow agitation. Then, the temperature of the resulting mixture was increased to a temperature of 60° C. to 80° C. with continuous agitation; and the temperature of the mixture was maintained at 60° C. to 80° C. for 24 hr. Thereafter, the agitation of the mixture was stopped and cooled down. The resulting copolymers were precipitated into methanol and the precipitation was put into a 40° C. vacuum oven for 24 hr to strip any residual solvent. The final copolymerized catalyst was achieved after the above stripping step.

Four catalyst samples Cat.1-Cat.4 were prepared using the above described synthesis of copolymerized crystalline catalyst procedure. In each of the catalyst samples prepared, the DBTM concentration and the acrylate monomer type were changed; and each of the resulting copolymers obtained showed a crystalline temperature and a melting temperature. The four catalyst samples, Cat.1-Cat.4, are described in Table II.

TABLE II

Copolymerized Crystalline Catalysts

| Catalyst No. | Composition Components | DBTM (wt %) | Crystalline Temperature (° C.) | Melting Temperature (° C.) |
|---|---|---|---|---|
| Cat. *1 | 22AA/DBTM | 5 | 53.1 | 58.9 |
| Cat. 2 | 22AA/DBTM | 15 | 50.2 | 55.6 |
| Cat. 3 | 22AA/DBTM | 40 | 48.1 | 53.2 |
| Cat. 4 | 18AA/DBTM | 15 | 41.4 | 49.4 |

*"Cat." is used as an abbreviation for "catalyst.

Examples 1-4 and Comparative Examples A and B

Application Performance Evaluation 2K Solventless (SL) PU Adhesive with Copolymerized Crystalline Catalyst Each of the four copolymerized crystalline catalysts described in Table II was added into a two-component (2k) solventless (SL) polyurethane (PU) adhesive composition to form an adhesive composition of the present invention; and to evaluate the performance of the adhesive compositions. The pot life and bond strength development performances of the adhesive compositions were evaluated. The performance results (pot life and bond strength development) of the adhesive compositions of the present invention, Inv. Ex. 1-4, containing a copolymerized crystalline catalyst described in Table II, Cat.1-4, respectively, were compared to: (1) a 2k SL PU adhesive composition without the presence of a copolymerized crystalline catalyst (Comp. Ex. A), and (2) a 2k SL PU adhesive composition containing pure DBTM, which is a non-copolymerized crystalline catalyst (Comp. Ex. B); and the performance results are described in Table III.

From the results in Table III, it is seen that the 2k SL PU adhesives of the present invention (Inv. Ex. 1-4) shows a comparable pot life at an operation temperature of 30° C. when compared to the adhesive without a copolymerized crystalline catalyst (Comp. Ex. A). However, the 2k SL PU adhesives with a copolymerized crystalline catalyst show a higher bond strength after 90 min of curing at 50° C. when compared to the adhesive without the copolymerized crystalline catalyst (Comp. Ex. A). It can be concluded, from the results in Table III, that the adhesive composition of the present invention with a copolymerized crystalline catalyst has a fast bond strength development and the adhesive composition's pot life is not compromised when the adhesive composition contains a copolymerized crystalline catalyst.

On the other hand, the 2k SL PU adhesive with a non-copolymerized catalyst (pure DBTM) (Comp. Ex. B) shows a much shorter pot life when compared to the 2k SL PU adhesives of the present invention (Inv. Ex. 1-4). Also, the 2k SL PU adhesive containing DBTM shows a much shorter pot life when compared to the adhesive without a catalyst (Comp. Ex. A) which means that the adhesive composition with pure DBTM (Comp. Ex. B) does not exhibit any latency. However, the bond strength of the 2k SL PU adhesive with pure DBTM (Comp. Ex. B) is similar to the bond strength of the 2k SL PU adhesives of the present invention (Inv. Ex. 1-4) with the copolymerized crystalline catalysts (Cat.1-4), respectively. Also, the 2k SL PU with pure DBTM (Comp. Ex. B) has a higher bond strength than the adhesive without a catalyst (Comp. Ex. A).

TABLE III

| Example No. | Adhesive Composition (2k SL PU) | Pot Life* (min) | Bond Strength** (N/15 mm) |
|---|---|---|---|
| Inv. Ex. 1 | MF706A/C79/Cat.1 = 100:60:1.6 | 29 | 2.63 |
| Inv. Ex. 2 | MF706A/C79/Cat.2 = 100:60:0.556 | 29 | 2.46 |
| Inv. Ex. 3 | MF706A/C79/Cat.3 = 100:60:0.2 | 30 | 2.28 |
| Inv. Ex. 4 | MF706A/C79/Cat.4 = 100:60:0.556 | 30 | 2.21 |
| Comp. Ex. A | MF706A/C79 = 100:60 | 31 | 1.98 |
| Comp. Ex. B | MF706A/C79/DBTM = 100:60:0.08 | 18 | 2.35 |

*Pot Life is the time to reach 3,000 mPa · s at 30° C.
**Bond Strength (BS) is for PET/PE40 after 90 min curing at 50° C.

What is claimed is:

1. An adhesive composition comprising a reaction mixture of:
   (A) at least one isocyanate-containing compound;
   (B) at least one polyol compound; and
   (C) at least one copolymerized crystalline latent catalyst comprising the reaction product of
   (i) at least one crystalline acrylate monomer selected from the group consisting of octadecyl acrylate, octadecyl methacrylate, docosyl acrylate, and docosyl methacrylate, and mixtures thereof;
   (ii) at least one copolymerizable catalyst compound that is grafted onto the crystalline polymer backbone to form a catalyst grafted crystalline polymer latent catalyst, wherein the copolymerizable catalyst compound is dibutyltin maleate (DBTM);
   (iii) at least one initiator;
   (iv) at least one chain transfer agent; and
   (v) optionally, at least one solvent.

2. The adhesive composition of claim 1, wherein the adhesive composition has at least a similar pot life, as measured by tracking the viscosity change of the adhesive composition at a temperature of 30° C. to 40° C. and recording the time the adhesive composition takes to reach 3,000 millipascals seconds viscosity, compared to an adhesive composition without the copolymerized crystalline latent catalyst of component (C).

3. The adhesive composition of claim 1, wherein the adhesive composition has a faster bond strength development at a temperature of 50° C. to 60° C., as measured by T-peel test, compared to an adhesive composition without the copolymerized crystalline latent catalyst of component (C).

4. The adhesive composition of claim 1, wherein the concentration of the at least one isocyanate-containing compound, component (A), is from 10 weight percent to 78 weight percent.

5. The adhesive composition of claim 4, wherein the concentration of the at least one polyol compound, component (B), is from 20 weight percent to 88 weight percent.

6. The adhesive composition of claim 5, wherein the concentration of the at least one copolymerized crystalline latent catalyst compound, component (C), is from 0.01 weight percent to 10 weight percent.

7. The adhesive composition of claim 6, wherein the melting point of the copolymerized crystalline latent catalyst is from 45° C. to 60° C.; and wherein the crystalline temperature of the copolymerized crystalline latent catalyst is from 40° C. to 55° C.

8. A process of making an adhesive composition comprising admixing:
   (A) at least one isocyanate-containing compound;
   (B) at least one polyol compound; and
   (C) a copolymerized crystalline latent catalyst comprising the reaction product of
   (i) at least one crystalline acrylate monomer selected from the group consisting of octadecyl acrylate, octadecyl methacrylate, docosyl acrylate, and docosyl methacrylate, and mixtures thereof;
   (ii) at least one copolymerizable catalyst compound that is grafted onto the crystalline polymer backbone to form a catalyst grafted crystalline polymer latent catalyst, wherein the copolymerizable catalyst compound is dibutyltin maleate (DBTM);
   (iii) at least one initiator;
   (iv) at least one chain transfer agent; and
   (v) optionally, at least one solvent.

9. A process for making a laminate structure comprising the steps of:
   (I) providing at least a first substrate and at least a second substrate;
   (II) applying the adhesive composition of claim 1 to at least a portion of one surface of the at least first substrate or the at least second substrate to form a film layer of adhesive disposed on the first or second substrate;
   (III) contacting the first and second substrates with the adhesive to form a layered laminate structure; wherein the adhesive is disposed between the first and second substrates; and
   (IV) heating the layered laminate structure to cure the adhesive such that a bonded laminate structure is formed.

10. A laminate structure made by the process of claim 9.

11. The adhesive composition of claim 1, wherein the chain transfer agent is dodecanethiol.

12. The adhesive composition of claim 11, wherein the initiator is azobisisobutyronitrile.

* * * * *